United States Patent
Fu et al.

(10) Patent No.: US 12,155,445 B2
(45) Date of Patent: Nov. 26, 2024

(54) APPARATUS AND METHOD OF WIRELESS COMMUNICATION

(71) Applicant: GUANGDONG OPPO MOBILE TELECOMMUNICATIONS CORP., LTD., Dongguan (CN)

(72) Inventors: Zhe Fu, Dongguan (CN); Xin You, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 349 days.

(21) Appl. No.: 17/554,081

(22) Filed: Dec. 17, 2021

(65) Prior Publication Data
US 2022/0109486 A1 Apr. 7, 2022

Related U.S. Application Data

(63) Continuation of application No. PCT/CN2020/130530, filed on Nov. 20, 2020.
(Continued)

(51) Int. Cl.
*H04B 7/06* (2006.01)
*H04W 72/1263* (2023.01)
(Continued)

(52) U.S. Cl.
CPC ...... *H04B 7/0695* (2013.01); *H04W 72/1263* (2013.01); *H04W 72/569* (2023.01); *H04W 76/19* (2018.02)

(58) Field of Classification Search
CPC . H04W 72/23; H04W 72/21; H04W 74/0833; H04W 76/19; H04W 72/569; H04W 76/27; H04W 72/12; H04W 72/56; H04W 24/10; H04W 72/0446; H04W 72/04; H04W 24/08; H04W 36/0077;
(Continued)

(56) References Cited

U.S. PATENT DOCUMENTS

| 2019/0261361 A1 | 8/2019 | Xiong et al. |
| 2019/0297537 A1* | 9/2019 | Tsai ...................... H04W 76/19 |

(Continued)

FOREIGN PATENT DOCUMENTS

| CN | 110139383 A | 8/2019 |
| CN | 110366260 A | 10/2019 |

(Continued)

OTHER PUBLICATIONS

Notice of Allowance issued in corresponding Chinese application No. 202111211144.8, mailed Jun. 8, 2023.
(Continued)

Primary Examiner — Khalid W Shaheed
(74) Attorney, Agent, or Firm — BAYES PLLC

(57) ABSTRACT

A wireless communication method, a user equipment (UE) and a base station are provided. The method includes performing, by the UE, one or more of a first operation and a second operation for a pending scheduling request (SR). The first operation includes if a resource for a SR transmission occasion overlaps with data, the UE performing a first prioritization. The second operation includes the UE performing a second prioritization by selecting a prioritized resource.

9 Claims, 2 Drawing Sheets

200

202 — Performing, by the UE 10, one or more of a first operation and/or a second operation for a pending scheduling request (SR), wherein the first operation comprises if a resource for a SR transmission occasion overlaps with data, the UE 10 performs a first prioritization based on at least one of the followings: configured/pre-defined priority between a secondary cell (SCell) beam failure recovery (BFR) SR and the data, prioritizing the SCell BFR SR or the data, prioritizing the SCell BFR SR having a higher priority than a priority of the data, and prioritizing the SCell BFR SR if no ultra-reliable low latency communication (URLLC) or no high priority data is multiplexed or can be multiplexed in a grant, wherein the second operation comprises the UE 10 performing a second prioritization by selecting a prioritized resource based on at least one of the followings: a SCell BFR SR resource, a priority configured to a SR configuration, and a resource configured to a SR

Related U.S. Application Data

(60) Provisional application No. 62/939,557, filed on Nov. 22, 2019.

(51) Int. Cl.
  *H04W 72/566* (2023.01)
  *H04W 76/19* (2018.01)

(58) Field of Classification Search
  CPC . H04W 24/04; H04B 7/06964; H04B 1/7143; H04L 5/0053; H04L 5/0094; H04L 5/001; H04L 5/0048; H04L 5/0044
  See application file for complete search history.

(56) References Cited

U.S. PATENT DOCUMENTS

| | | | |
|---|---|---|---|
| 2019/0297547 A1* | 9/2019 | Tsai | H04L 5/0048 |
| 2019/0306875 A1 | 10/2019 | Zhou et al. | |
| 2020/0267797 A1* | 8/2020 | Wei | H04W 72/23 |

FOREIGN PATENT DOCUMENTS

| | | |
|---|---|---|
| EP | 3567776 A1 | 11/2019 |
| WO | 2019033072 A1 | 2/2019 |

OTHER PUBLICATIONS

Second Office Action issued in corresponding European application No. 20890450.8, mailed Jul. 31, 2023.
International Search Report issued in corresponding International Application No. PCT/CN2020/130530, mailed Feb. 18, 2021, 32 pages.
PCT Written Opinion of the International Searching Authority issued in corresponding International Application No. PCT/CN2020/130530, mailed Feb. 18, 2021, 4 pages.
"Prioritization of SR Transmission for URLLC", Agenda item: 6.7.3.3, Source: Samsung, 3GPP TSG-RAN2 Meeting #108, R2-1915340, Reno, USA, Nov. 18-22, 2019, 4 pages.
"Summary of [107bis#61][NR eMIMO] Scell BFR MAC CR (Nokia, Samsung)", Agenda item: 6.16.4, Source: Nokia, Nokia Shanghai Bell, 3GPP TSG-RAN WG2 Meeting #108, R2-1915331, Reno, Nevada, USA, Oct. 14-18, 2019, 43 pages.
"3rd Generation Partnership Project; Technical Specification Group Radio Access Network; NR; Medium Access Control (MAC) protocol specification (Release 16)", 3GPP TS 38.321 V16.2.1 (Sep. 2020), 153 pages.
Extended European Search Report issued in corresponding European application No. 20890450.8, mailed Jun. 1, 2022.
First Office Action issued in corresponding Indian application No. 202117056772, mailed Jun. 29, 2022.
First Office Action issued in corresponding Chinese application No. 202111211144.8, mailed Jan. 19, 2023.
First Office Action issued in corresponding European application No. 20890450.8, mailed Feb. 16, 2023.
Second Office Action issued in corresponding Chinese application No. 202111211144.8, mailed Apr. 5, 2023.

* cited by examiner

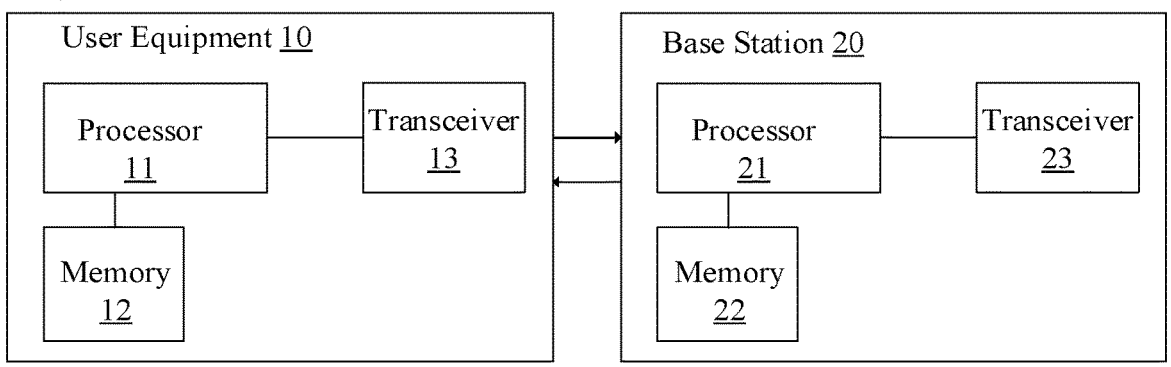

202 → Performing, by the UE 10, one or more of a first operation and/or a second operation for a pending scheduling request (SR), wherein the first operation comprises if a resource for a SR transmission occasion overlaps with data, the UE 10 performs a first prioritization based on at least one of the followings: configured/pre-defined priority between a secondary cell (SCell) beam failure recovery (BFR) SR and the data, prioritizing the SCell BFR SR or the data, prioritizing the SCell BFR SR having a higher priority than a priority of the data, and prioritizing the SCell BFR SR if no ultra-reliable low latency communication (URLLC) or no high priority data is multiplexed or can be multiplexed in a grant, wherein the second operation comprises the UE 10 performing a second prioritization by selecting a prioritized resource based on at least one of the followings: a SCell BFR SR resource, a priority configured to a SR configuration, and a resource configured to a SR

302 — Determining, from the user equipment (UE) 10 by the base station 20, a pending scheduling request (SR), wherein the pending SR is associated with one or more of a first operation and/or a second operation; wherein the first operation comprises if a resource for a SR transmission occasion overlaps with data, a first prioritization performed by the UE 10 is based on at least one of the followings: configured/pre-defined priority between a secondary cell (SCell) beam failure recovery (BFR) SR and the data; prioritizing the SCell BFR SR or the data; prioritizing the SCell BFR SR having a higher priority than a priority of the data; and prioritizing the SCell BFR SR if no ultra-reliable low latency communication (URLLC) or no high priority data is multiplexed or can be multiplexed in a grant; wherein the second operation comprises the UE 10 performing a second prioritization by selecting a prioritized resource based on at least one of the followings: a SCell BFR SR resource; a priority configured to a SR configuration; and a resource configured to a SR

FIG. 3

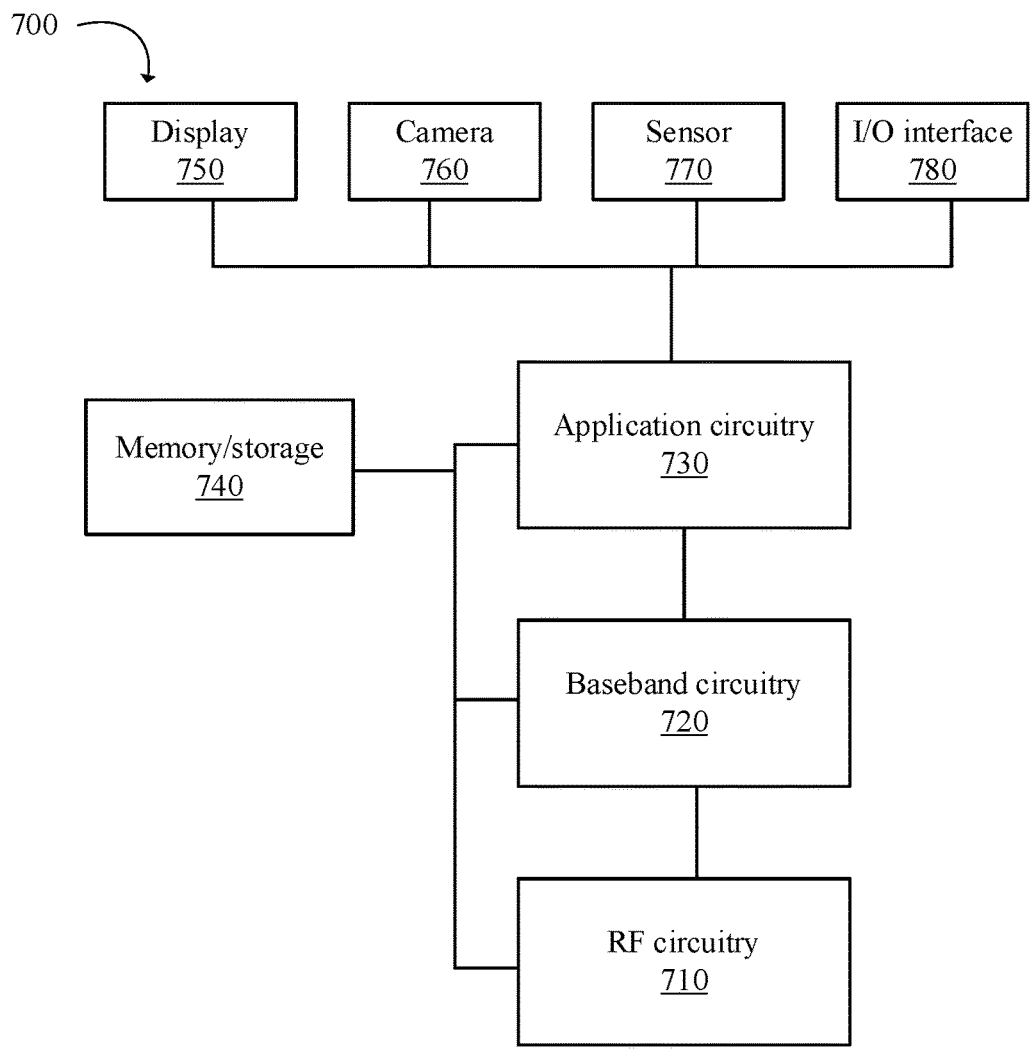

FIG. 4

APPARATUS AND METHOD OF WIRELESS COMMUNICATION

CROSS-REFERENCE TO RELATED APPLICATION

This application is a continuation of International Application No. PCT/CN2020/130530, filed on Nov. 20, 2020, which claims the benefit of priority to U.S. Application No. 62/939,557, filed on Nov. 22, 2019, both of which are hereby incorporated by reference in their entireties.

BACKGROUND

The present disclosure relates to the field of communication systems, and more particularly, to an apparatus and a method of wireless communication, which can provide a good communication performance and/or high reliability.

Wireless communication systems are widely deployed to provide various types of communication content such as voice, video, packet data, messaging, broadcast, and so on. These wireless communication systems may be capable of supporting communication with multiple users by sharing available system resources (e.g., time, frequency, and power). Examples of such multiple-access systems include fourth generation (4G) systems such as long term evolution (LTE) systems and fifth generation (5G) systems which may be referred to as new radio (NR) systems. A wireless multiple-access communications system may include a number of base stations or network access nodes, each simultaneously supporting communication for multiple communication devices, which may be otherwise known as user equipments (UEs).

A wireless communication network may include a base station that can support communication for a UE. The UE may communicate with the base station via downlink and uplink. The downlink refers to a communication link from the base station to the UE, and the uplink refers to a communication link from the UE to the base station. In the wireless communication system operating in high frequency bands, paging transmission/reception leads to increased signaling overhead and UE power consumption. 3GPP TSG-RAN WG2 Meeting #108, R2-1915331 is a related prior art for this field. More particularly, R2-1915331 discloses an option 2 in which secondary cell (SCell) beam failure recovery (BFR) medium access control (MAC) control element (CE) should have higher priority at least than "single entry physical (PHR) MAC CE or multiple entry PHR MAC CE" and "MAC CE for buffer status report (BSR), with exception of BSR included for padding". Further, a proposal in which SCell BFR MAC CE has higher priority at least than "data from any logical channel, except data from uplink common control channel (UL-CCCH)", higher priority is further for study (FFS). Therefore, there is an open issue on how the UE preforms prioritization for a scheduling request (SR) overlapping an uplink shared channel (UL-SCH) resource. Further, it is unclear which layer of the UE has responsibility on the prioritization.

Therefore, there is a need for an apparatus (such as a user equipment (UE) and/or a base station) and a method of wireless communication, which can solve issues in the prior art, provide prioritization involving scheduling request (SR), provide a good communication performance, and/or provide high reliability.

SUMMARY

An object of the present disclosure is to propose an apparatus (such as a user equipment (UE) and/or a base station) and a method of wireless communication, which can solve issues in the prior art, provide prioritization involving scheduling request (SR), provide a good communication performance, and/or provide high reliability.

In a first aspect of the present disclosure, a method of wireless communication by a user equipment (UE), comprising performing, by the UE, one or more of a first operation and a second operation for a pending scheduling request (SR); wherein the first operation comprises if a resource for a SR transmission occasion overlaps with data, the UE performs a first prioritization based on at least one of the followings: configured/pre-defined priority between a secondary cell (SCell) beam failure recovery (BFR) SR and the data, prioritizing the SCell BFR SR or the data, prioritizing the SCell BFR SR having a higher priority than a priority of the data, and prioritizing the SCell BFR SR if no ultra-reliable low latency communication (URLLC) or no high priority data is multiplexed or can be multiplexed in a grant; wherein the second operation comprises the UE performing a second prioritization by selecting a prioritized resource based on at least one of the followings: a SCell BFR SR resource, a priority configured to a SR configuration, and a resource configured to a SR.

In a second aspect of the present disclosure, a method of wireless communication by a base station comprising determining, from a user equipment (UE) by the base station, a pending scheduling request (SR), wherein the pending SR is associated with one or more of a first operation and a second operation; wherein the first operation comprises if a resource for a SR transmission occasion overlaps with data, a first prioritization performed by the UE is based on at least one of the followings: configured/pre-defined priority between a secondary cell (SCell) beam failure recovery (BFR) SR and the data; prioritizing the SCell BFR SR or the data; prioritizing the SCell BFR SR having a higher priority than a priority of the data; and prioritizing the SCell BFR SR if no ultra-reliable low latency communication (URLLC) or no high priority data is multiplexed or can be multiplexed in a grant; wherein the second operation comprises the UE performing a second prioritization by selecting a prioritized resource based on at least one of the followings: a SCell BFR SR resource; a priority configured to a SR configuration; and a resource configured to a SR.

In a third aspect of the present disclosure, a user equipment comprises a memory, a transceiver, and a processor coupled to the memory and the transceiver. The processor is configured to perform one or more of a first operation and a second operation for a pending scheduling request (SR); wherein the first operation comprises if a resource for a SR transmission occasion overlaps with data, the processor performs a first prioritization based on at least one of the followings: configured/pre-defined priority between a secondary cell (SCell) beam failure recovery (BFR) SR and the data; prioritizing the SCell BFR SR or the data; prioritizing the SCell BFR SR having a higher priority than a priority of the data; and prioritizing the SCell BFR SR if no ultra-reliable low latency communication (URLLC) or no high priority data is multiplexed or can be multiplexed in a grant; wherein the second operation comprises the processor performing a second prioritization by selecting a prioritized resource based on at least one of the followings: a SCell BFR SR resource; a priority configured to a SR configuration; and a resource configured to a SR.

In a fourth aspect of the present disclosure, a base station comprises a memory, a transceiver, and a processor coupled to the memory and the transceiver. The processor is configured to determine, from a user equipment (UE), a pending scheduling request (SR), wherein the pending SR is associated with one or more of a first operation and a second operation; wherein the first operation comprises if a resource for a SR transmission occasion overlaps with data, a first prioritization performed by the UE is based on at least one of the followings: configured/pre-defined priority between a secondary cell (SCell) beam failure recovery (BFR) SR and the data; prioritizing the SCell BFR SR or the data; prioritizing the SCell BFR SR having a higher priority than a priority of the data; and prioritizing the SCell BFR SR if no ultra-reliable low latency communication (URLLC) or no high priority data is multiplexed or can be multiplexed in a grant; wherein the second operation comprises the UE performing a second prioritization by selecting a prioritized resource based on at least one of the followings: a SCell BFR SR resource; a priority configured to a SR configuration; and a resource configured to a SR.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

FIG. 1 is a block diagram of one or more user equipments (UEs) and a base station of wireless communication in a communication network system according to an embodiment of the present disclosure.

FIG. 2 is a flowchart illustrating a method of wireless communication performed by a user equipment (UE) according to an embodiment of the present disclosure.

FIG. 3 is a flowchart illustrating a method of wireless communication performed by a base station according to an embodiment of the present disclosure.

FIG. 4 is a block diagram of a system for wireless communication according to an embodiment of the present disclosure.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Intra-user equipment (UE) prioritization and multiplexing: Resource conflicts between dynamic grant (DG) and configured grant (CG) physical uplink shared channel (PUSCH) and conflicts involving multiple CGs.

In a current discussion, issues on how a medium access control (MAC) layer preforms prioritization for a scheduling request (SR) overlapping a physical uplink shared channel (PUSCH) is discussed. A relate logical channel (LCH) is used as the principle for a collision case. Details can be referred in the following:

For CGCG conflicts and CGDG conflicts, a priority value of an uplink grant (uplink shared channel (UL-SCH) resource) is the highest priority of the LCHs that is multiplexed or can be multiplexed in MAC protocol data unit (PDU), taking into account LCH restrictions and data availability.

If a physical uplink control channel (PUCCH) resource for an SR transmission occasion overlaps a UL-SCH resource, SR transmission is allowed (prioritized) based on a comparison of priority of the LCH that triggered the SR and a priority value for the UL-SCH resource (where the priority value is determined as in current agreement), if the priority of the LCH that triggered the SR is higher.

For CG-CG conflict with equal priority, prioritization is up to UE implementation.

For SR-Data conflict with equal priority, UL-SCH (i.e. data) is prioritized.

Issue 1: A current discussion only focuses on the case, where an SR is triggered by a beam failure recovery (BFR) MAC control element (CE). Since the BSR MAC CE is triggered by LCH, we can simply say SR is related to a specific LCH.

However, in release 16 (Rel-16), SR can be triggered by other MAC CE, such as a BFR MAC CE. BFR MAC CE is triggered due to beam failure. This is not related to LCH, but related to downlink (DL) channel quality issue. And the SR triggered by the BFR MAC CE can also collide with PUSCH. Thus, it is clear this case cannot be handled by a current radio layer 2 (RAN2) agreement, and there is a need for further discussion.

In addition, there is an issue on collision between and a secondary cell (SCell) BFR SR and other SR PUCCH resource. As a conclusion, in the SCell BFR SR overlapping SR PUCCH resource case, the SCell BFR SR is prioritized.

Agreements are as following: Parameters, beamFailureDetectionTimer and beamFailureInstanceMaxCount are configured cell specifically per each DL BWP configured.

Upon reconfiguration of beamFailureDetectionTimer, beamFailureInstanceMaxCount, or any of the reference signals used for beam failure detection by upper layers, BFI COUNTER is set to 0 for the given Serving Cell.

When SCell BFR SR resource is not configured and SCell BFR MAC CE transmission triggers SCell BFR SR, random access procedure on SpCell is triggered to request UL resources to transmit the SCell BFR MAC CE (similarly to Rel-15 behavior on SR).

When SCell BFR SR is triggered and the UE has an overlapping SR PUCCH resource with the SCell BFR SR PUCCH resource, the UE shall select the SCell BFR SR PUCCH resource for transmission.

Pending SR for SCell beam failure recovery triggered prior to the MAC PDU assembly shall be cancelled when the MAC PDU is transmitted and this PDU includes a SCell BFR MAC CE.

SCell BFR MAC CE can carry information of multiple failed SCells, i.e., multiple entry format for SCell BFR MAC CE is defined.

For each SCell, the SCell BFR MAC CE indicates the following information: information about the failed SCell index; indication if a new candidate beam RS is detected or not; and/or new candidate beam RS index (if available).

SCell BFR MAC CE has higher priority at least than "data from any logical channel, except data from uplink common control channel (UL-CCCH)" and LBT MAC CE, higher priority is further for study (FFS).

Issue 2: It is unclear which layer of the UE has the responsibility on the prioritization.

Scheduling request (SR): As long as at least one SR is pending, the MAC entity shall for each pending SR:
1> if the MAC entity has no valid PUCCH resource configured for the pending SR:
  2> initiate a random access procedure on the SpCell and cancel the pending SR.
1> else, for the SR configuration corresponding to the pending SR:
  2> when the MAC entity has an SR transmission occasion on the valid PUCCH resource for SR configured; and
  2> if sr-ProhibitTimer is not running at the time of the SR transmission occasion; and
  2> if the PUCCH resource for the SR transmission occasion does not overlap with a measurement gap; and
  2> if the PUCCH resource for the SR transmission occasion does not overlap with a UL-SCH resource:
    3> if SR_COUNTER<sr-TransMax:
      4> increment SR_COUNTER by 1;
      4> instruct the physical layer to signal the SR on one valid PUCCH resource for SR,
      4> start the sr-ProhibitTimer.
    3> else:

In the above current discussion, there is an open issue on how the UE preforms prioritization for a scheduling request (SR) overlapping an uplink shared channel (UL-SCH) resource. Further, it is unclear which layer of the UE has responsibility on the prioritization. Therefore, some embodiments of the present disclosure propose an apparatus (such as a user equipment (UE) and/or a base station) and a method of wireless communication, which can solve issues in the prior art, provide prioritization involving scheduling request (SR), provide a good communication performance, and/or provide high reliability.

FIG. 1 illustrates that, in some embodiments, one or more user equipments (UEs) 10 and a base station (e.g., gNB or eNB) 20 for wireless communication in a communication network system 30 according to an embodiment of the present disclosure are provided. The communication network system 30 includes the one or more UEs 10 and the base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured to perform one or more of a first operation and a second operation for a pending scheduling request (SR); wherein the first operation comprises if a resource for a SR transmission occasion overlaps with data, the processor 11 performs a first prioritization based on at least one of the followings: configured/pre-defined priority between a secondary cell (SCell) beam failure recovery (BFR) SR and the data; prioritizing the SCell BFR SR or the data; prioritizing the SCell BFR SR having a higher priority than a priority of the data; and prioritizing the SCell BFR SR if no ultra-reliable low latency communication (URLLC) or no high priority data is multiplexed or can be multiplexed in a grant; wherein the second operation comprises the processor 11 performing a second prioritization by selecting a prioritized resource based on at least one of the followings: a SCell BFR SR resource; a priority configured to a SR configuration; and a resource configured to a SR. This can solve issues in the prior art, provide prioritization involving scheduling request (SR), provide a good communication performance, and/or provide high reliability.

In some embodiments, the processor 21 is configured to determine, from the user equipment (UE) 10, a pending scheduling request (SR), wherein the pending SR is associated with one or more of a first operation and a second operation; wherein the first operation comprises if a resource for a SR transmission occasion overlaps with data, a first prioritization performed by the UE 10 is based on at least one of the followings: configured/pre-defined priority between a secondary cell (SCell) beam failure recovery (BFR) SR and the data; prioritizing the SCell BFR SR or the data; prioritizing the SCell BFR SR having a higher priority than a priority of the data; and prioritizing the SCell BFR SR if no ultra-reliable low latency communication (URLLC) or no high priority data is multiplexed or can be multiplexed in a grant; wherein the second operation comprises the UE 10 performing a second prioritization by selecting a prioritized resource based on at least one of the followings: a SCell BFR SR resource; a priority configured to a SR configuration; and a resource configured to a SR. This can solve issues in the prior art, provide prioritization involving scheduling request (SR), provide a good communication performance, and/or provide high reliability.

FIG. 2 illustrates a method 200 of wireless communication by the user equipment (UE) 10 according to an embodiment of the present disclosure. In some embodiments, the method 200 includes: a block 202, performing, by the UE 10, one or more of a first operation and a second operation for a pending scheduling request (SR), wherein the first operation comprises if a resource for a SR transmission occasion overlaps with data, the UE 10 performs a first prioritization based on at least one of the followings: configured/pre-defined priority between a secondary cell (SCell) beam failure recovery (BFR) SR and the data, prioritizing the SCell BFR SR or the data, prioritizing the SCell BFR SR having a higher priority than a priority of the data, and prioritizing the SCell BFR SR if no ultra-reliable low latency communication (URLLC) or no high priority data is multiplexed or can be multiplexed in a grant, wherein the second operation comprises the UE 10 performing a second prioritization by selecting a prioritized resource based on at least one of the followings: a SCell BFR SR resource, a priority configured to a SR configuration, and a resource configured to a SR. This can solve issues in the prior art, provide prioritization involving scheduling request (SR), provide a good communication performance, and/or provide high reliability.

FIG. 3 illustrates a method 300 of wireless communication by the base station 20 according to an embodiment of the present disclosure. In some embodiments, the method 300 includes: a block 302, determining, from the user equipment (UE) 10 by the base station 20, a pending scheduling request (SR), wherein the pending SR is associated with one or more of a first operation and a second operation; wherein the first operation comprises if a resource for a SR transmission occasion overlaps with data, a first prioritization performed by the UE 10 is based on at least one of the followings: configured/pre-defined priority between a secondary cell (SCell) beam failure recovery (BFR) SR and the data; prioritizing the SCell BFR SR or the data; prioritizing the SCell BFR SR having a higher priority than a priority of the data; and prioritizing the SCell BFR SR if no ultra-reliable low latency communication (URLLC) or no high priority data is multiplexed or can be multiplexed in a grant; wherein the second operation comprises the UE 10 performing a second prioritization by selecting a prioritized resource based on at least one of the followings: a SCell BFR SR resource; a priority configured to a SR configuration; and a resource configured to a SR. This can solve issues in the prior art, provide prioritization involving scheduling request (SR), provide a good communication performance, and/or provide high reliability.

In some embodiments, one or more of a first operation and/or a second operation may comprise one or more of the first operation and the second operation; or one or more of the first operation or the second operation. One or more of the first operation and the second operation may comprise the first operation, the second operation, or the first operation and the second operation, etc. One or more of the first operation or the second operation may comprise the first operation, the second operation, multiples of the first operation, or multiples of the second operation, etc. In some embodiments, the data comprises an uplink shared channel (UL-SCH) resource. In some embodiments, the first prioritization can be performed in one or more of a medium access control (MAC) layer and a physical (PHY) layer of the UE 10. In some embodiments, if the first prioritization can be performed in the PHY layer, both the SR and the data are delivered to the PHY layer. In some embodiments, if one collision resource of the SR and the data is delivered to the PHY layer, a latter one resource of the SR and the data is not delivered to the PHY layer. In some embodiments, if the first prioritization can be performed in the MAC layer and the PHY layer and if the first prioritization is performed before both the SR and the data are delivered to the PHY layer, only one resource of the SR and the data is delivered. In some embodiments, if one collision resource of the SR and the data is delivered to the PHY layer, a latter one resource of the SR and the data is delivered to the PHY layer if the later one resource of the SCell BFR SR and the data has a higher priority or is prioritized. In some embodiments, if the resource for the SR transmission occasion overlaps with the data, at least one of the followings is fulfilled: the UE 10 is configured with a prioritization parameter and the SR has a higher priority than the data or the SR is prioritized; the UE 10 is configured with the prioritization parameter and it is the SCell BFR SR; the UE 10 is configured with the prioritization parameter and it is the SCell BFR SR which has a higher priority than a priority of the data; the UE 10 is configured with the prioritization parameter and it is the SCell BFR SR and no URLLC/higher priority data is multiplexed or can be multiplexed in the grant; the SR has a higher priority than the data and the SR is prioritized; it is the SCell BFR SR; it is the SCell BFR SR which has a higher priority than the priority of the data; and it is the SCell BFR SR and no URLLC/higher priority data is multiplexed or can be multiplexed in the grant.

In some embodiments, a prioritized resource comprises a prioritized physical uplink control channel (PUCCH) resource. In some embodiments, the second prioritization can be performed in one or more of a medium access control (MAC) layer and a physical (PHY) layer of the UE 10. In some embodiments, if the second prioritization can be performed in the PHY layer, both a first SR and a second SR are delivered to the PHY layer. In some embodiments, if the second prioritization can be performed in the MAC layer, one of a first SR and a second SR is delivered to the PHY layer. In some embodiments, if a first SR is delivered to the PHY layer, a latter second SR is not delivered to the PHY layer. In some embodiments, if the second prioritization can be performed in the MAC layer and the PHY layer and the second prioritization is performed before a first SR and a second SR are delivered to the PHY layer, only one of the first SR and the second SR is delivered. In some embodiments, if one collision resource of a first SR and a second SR is delivered to the PHY layer, the latter one resource of the first SR and the second SR is delivered to the PHY layer if the later one resource of the first SR and the second SR has a higher priority or the later one resource of the first SR and the second SR is prioritized.

In some embodiments, at least one of the followings is filled: the UE 10 is configured with a prioritization parameter and a first SR has a higher priority than a second SR triggered by a logical channel (LCH) or the first SR is prioritized; the UE 10 is configured with the prioritization parameter and it is the SCell BFR SR; the UE 10 is configured with the prioritization parameter and the resource for the SR transmission occasion does not overlap with the resource for SCell BFR SR; the UE 10 is configured with the prioritization parameter and the resource for the SR transmission occasion does not overlap with a resource for SR with a higher priority; the first SR has a higher priority than the second SR triggered by the LCH or the first SR is prioritized; it is the SCell BFR SR; the resource for the SR transmission occasion does not overlap with a resource for SCell BFR SR; and the resource for the SR transmission occasion does not overlap with the resource for SR with higher priority. In some embodiments, if the UE 10 is configured with a prioritization parameter, and the resource for the SR transmission occasion overlaps with the data, the SR is prioritized. In some embodiments, the SCell BFR SR is not triggered by an LCH. In some embodiments, the SCell BFR SR is not related to the LCH. In some embodiments, the SCell BFR SR is triggered due to beam failure.

MAC Entities:

FIG. 1 illustrates that, in some embodiments, MAC entity of the UE 10 handles the following transport channels:

broadcast channel (BCH), downlink shared channel(s) (DL-SCH), paging channel (PCH), uplink shared channel(s) (UL-SCH), and random access channel(s) (RACH). In addition, the MAC entity of the UE 10 handles the following transport channel for sidelink: sidelink shared channel (SL-SCH), and sidelink broadcast channel (SL-BCH). When the UE 10 is configured with SCG, two MAC entities are configured to the UE: one for a master cell group (MCG) and one for a secondary cell group (SCG). If the MAC entity is configured with one or more SCells, there are multiple DL-SCHs and there may be multiple UL-SCHs as well as multiple RACHs per MAC entity, one DL-SCH, one UL-SCH, and one RACH on a special Cell (SpCell), one DL-SCH, zero or one UL-SCH, and zero or one RACH for each SCell. In some embodiments, for dual connectivity operation, the term SpCell refers to a primary cell (PCell) of the MCG or a primary SCell (pSCell) of the SCG depending on if the MAC entity is associated to the MCG or the SCG, respectively. Otherwise the term SpCell refers to the PCell. A SpCell supports a physical uplink control channel (PUCCH) transmission and a contention-based random access, and is always activated.

Logical Channels (LCHs):

A MAC sublayer provides data transfer services on logical channels. To accommodate different kinds of data transfer services, multiple types of logical channels are defined i.e. each supporting transfer of a particular type of information. Each logical channel type is defined by what type of information is transferred. The MAC sublayer provides control and traffic channels listed in Table 1 below.

TABLE 1

Logical channels provided by MAC

| Logical channel name | Acronym | Control channel | Traffic channel |
|---|---|---|---|
| Broadcast Control Channel | BCCH | X | |
| Paging Control Channel | PCCH | X | |
| Common Control Channel | CCCH | X | |
| Dedicated Control Channel | DCCH | X | |
| Dedicated Traffic Channel | DTCH | | X |
| Sidelink Broadcast Control Channel | SBCCH | X | |
| Sidelink Control Channel | SCCH | X | |
| Sidelink Traffic Channel | STCH | | X |

Example: Technical solution for issue 1: For the SR collision case mentioned in issue 1, the following technical solution can be used.

FIG. 1 illustrates that, in some embodiments, the UE 10 do prioritization based on one of the following options: Configured/pre-defined priority between SCell BFR SR and data (UL-SCH); always prioritizing SCell BFR SR or data (UL-SCH); prioritizing SCell BFR SR having a higher priority than a priority of UL-SCH; and/or prioritizing SCell BFR SR if no URLLC/high priority data is multiplexed or can be multiplexed in a grant. This can solve issues in the prior art, provide prioritization involving scheduling request (SR), provide a good communication performance, and/or provide high reliability.

In some embodiments, the prioritization can be performed in a MAC layer and/or a PHY layer of the UE. In some embodiments, if the prioritization can be performed in the PHY layer, both SR and data are delivered to the PHY layer. In some embodiments, if the prioritization can be performed in the MAC layer, either SR or data is delivered to the PHY layer. Optionally, if one collision resource of one of SR and data is delivered to the PHY, the latter one of another of SR and data shall not be delivered to the PHY layer. In some embodiments, if the prioritization can be performed in the MAC layer and the PHY layer and the prioritization is performed before both SR and data are delivered to the PHY layer, only one resource is delivered. If one collision resource is delivered to the PHY layer, the latter one will be delivered to the PHY layer if the later one has a higher priority or is prioritized.

Technical solution for issue 2: For the SR collision case mentioned in issue 2, the following technical solution can be used.

FIG. 1 illustrates that, in some embodiments, the UE 10 selects a prioritized PUCCH resource according at least one of the followings: SCell BFR SR PUCCH resource; priority configured to SR configuration; and/or PUCCH resource configured to SR. This can solve issues in the prior art, provide prioritization involving scheduling request (SR), provide a good communication performance, and/or provide high reliability.

In some embodiments, the prioritization can be performed in a MAC layer and/or a PHY layer of the UE. In some embodiments, if the prioritization can be performed in the PHY layer, both SRs are delivered to the PHY layer. In some embodiments, if the prioritization can be performed in the MAC layer, one of the SRs is delivered to the PHY layer. Optionally, if one SR is delivered to the PHY layer, the latter SR shall not be delivered to the PHY layer. In some embodiments, if the prioritization can be performed in the MAC layer and the PHY layer and the prioritization is performed before both SRs are delivered to the PHY layer, only one SR is delivered. If one collision resource is delivered to the PHY layer, the latter one will be delivered to the PHY layer if the later on has a higher priority or is prioritized.

Implementation of the procedure in the MAC specification can be as follows:

Option 1 for Issue 1:

Scheduling Request (SR):

As long as at least one SR is pending, the MAC entity shall for each pending SR:

1> if the MAC entity has no valid PUCCH resource configured for the pending SR:
   2> initiate a Random Access procedure on the SpCell and cancel the pending SR.
1> else, for the SR configuration corresponding to the pending SR:
   2> when the MAC entity has an SR transmission occasion on the valid PUCCH resource for SR configured; and
   2> if sr-ProhibitTimer is not running at the time of the SR transmission occasion; and
   2> if the PUCCH resource for the SR transmission occasion does not overlap with a measurement gap:
      3> if the PUCCH resource for the SR transmission occasion does not overlap with a UL-SCH resource; or
      3> if the MAC entity is configured with priority-BasedPrioritization, and the PUCCH resource for the SR transmission occasion overlaps with a UL-SCH resource, and the SR is prioritized: or
      3> if the PUCCH resource for the SR transmission occasion overlaps with a UL-SCH resource, and either of A is fulfilled:
         4> if SR_COUNTER<sr-TransMax:
            5> increment SR_COUNTER by 1;
            5> instruct the physical layer to signal the SR on one valid PUCCH resource for SR;
            5> start the sr-ProhibitTimer.

4> else:
  5> notify RRC to release PUCCH for all Serving Cells;
  5> notify RRC to release SRS for all Serving Cells;
  5> clear any configured downlink assignments and uplink grants;
  5> clear any PUSCH resources for semi-persistent CSI reporting;
  5> initiate a Random Access procedure on the SpCell and cancel all pending SRs.

A:

The MAC entity is configured with priorityBasedPrioritizationM and SR is with a higher priority than UL-SCH/prioritized; or the MAC entity is configured with priorityBasedPrioritizationM and it is SCell BFR SR; or the MAC entity is configured with priorityBasedPrioritizationM and it is SCell BFR SR which has a higher priority than the priority of UL-SCH; or the MAC entity is configured with priorityBasedPrioritizationM and it is SCell BFR SR and no URLLC/higher priority data is multiplexed or can be multiplexed in the grant; or SR is with a higher priority than UL-SCH/prioritized; or it is SCell BFR SR; or it is SCell BFR SR which has a higher priority than the priority of UL-SCH; or it is SCell BFR SR and no URLLC/higher priority data is multiplexed or can be multiplexed in the grant.

In addition, one of the following is the criteria on whether it is the prioritized SR: Configured/pre-defined priority between SCell BFR SR and data (UL-SCH); or always prioritizing SCell BFR SR or data (UL-SCH); or prioritizing SCell BFR SR has a higher priority than the priority of UL-SCH; or prioritizing SCell BFR SR if no URLLC/higher priority data is multiplexed or can be multiplexed in the grant.

Option 2 for Issue 2:

Scheduling Request (SR):

As long as at least one SR is pending, the MAC entity shall for each pending SR:
1> if the MAC entity has no valid PUCCH resource configured for the pending SR:
  2> initiate a Random Access procedure on the SpCell and cancel the pending SR.
1> else, for the SR configuration corresponding to the pending SR:
  2> when the MAC entity has an SR transmission occasion on the valid PUCCH resource for SR configured; and
  2> if sr-ProhibitTimer is not running at the time of the SR transmission occasion; and
  2> if the PUCCH resource for the SR transmission occasion does not overlap with a measurement gap:
    3> if the PUCCH resource for the SR transmission occasion does not overlap with a UL-SCH resource; or
    3> if the MAC entity is configured with priorityBasedPrioritization, and the PUCCH resource for the SR transmission occasion overlaps with a UL-SCH resource, and the SR is prioritized: or
    3> if either of A is fulfilled:
      4> if SR_COUNTER<sr-TransMax:
        5> increment SR_COUNTER by 1;
        5> instruct the physical layer to signal the SR on one valid PUCCH resource for SR;
        5> start the sr-ProhibitTimer.
      4> else:
        5> notify RRC to release PUCCH for all Serving Cells;
        5> notify RRC to release SRS for all Serving Cells;
        5> clear any configured downlink assignments and uplink grants;
        5> clear any PUSCH resources for semi-persistent CSI reporting;
        5> initiate a Random Access procedure on the SpCell and cancel all pending SRs.

A:

The MAC entity is configured with priorityBasedPrioritizationM and the SR is with a higher priority than other SR triggered by LCH/prioritized; or the MAC entity is configured with priorityBasedPrioritizationM and it is SCell BFR SR; or the MAC entity is configured with priorityBasedPrioritizationM and the PUCCH resource for the SR transmission occasion does not overlap with PUCCH resource for SCell BFR SR; or the MAC entity is configured with priorityBasedPrioritizationM and the PUCCH resource for the SR transmission occasion does not overlap with PUCCH resource for SR with higher priority, i.e. SCell BFR SR; or the SR is with a higher priority than other SR triggered by LCH/prioritized; or it is SCell BFR SR; or the PUCCH resource for the SR transmission occasion does not overlap with PUCCH resource for SCell BFR SR; or the PUCCH resource for the SR transmission occasion does not overlap with PUCCH resource for SR with higher priority, i.e. SCell BFR SR.

In some embodiments, an implementation of the procedure in the MAC specification can be as follows:

Scheduling Request (SR):

The Scheduling Request (SR) is used for requesting UL-SCH resources for new transmission. The MAC entity may be configured with zero, one, or more SR configurations. An SR configuration consists of a set of PUCCH resources for SR across different BWPs and cells. For a logical channel or for SCell beam failure recovery and for consistent LBT failure, at most one PUCCH resource for SR is configured per BWP. Each SR configuration corresponds to one or more logical channels and/or to SCell beam failure recovery and/or to consistent LBT failure. Each logical channel, SCell beam failure recovery, and consistent LBT failure, may be mapped to zero or one SR configuration, which is configured by RRC. The SR configuration of the logical channel that triggered a BSR or the SCell beam failure recovery or the consistent LBT failure (if such a configuration exists) is considered as corresponding SR configuration for the triggered SR. Any SR configuration may be used for an SR triggered by Pre-emptive BSR. Further, each SR configuration corresponds to one or more logical channels and/or to SCell beam failure recovery. This proves that BFR SR is not related to LCH. Beneficial effects: In the prior art, BFR is higher than BSR, and BSR is higher than LCH transmission. Generally, it should be transmitted first High priority. The priority transmission of the BSR is now. BFR is a higher priority. However, the BFR is not transmitted first, thinking that repair of the SCell BFR itself is not a very urgent matter, and there is also PCell downlink. In addition, because the data may require high-delay LCH data, it is necessary to ensure the priority transmission of such services. In this way, it is compatible with the original technology and achieves the desired effect. In some embodiments, in release 16 (Rel-16), SR can be triggered by other MAC CE, such as a BFR MAC CE. BFR MAC CE is triggered due to beam failure. This is not related to LCH, but related to downlink (DL) channel quality issue. Therefore, BFR MAC CE is not triggered by LCH. BFR SR is not triggered by LCH.

RRC configures the following parameters for the scheduling request procedure: sr-ProhibitTimer (per SR configuration); and/or sr-TransMax (per SR configuration).

The following UE variables are used for the scheduling request procedure: SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled. Except for SCell beam failure recovery, all pending SR(s) for BSR triggered according to the BSR procedure prior to the MAC PDU assembly shall be cancelled and each respective sr-ProhibitTimer shall be stopped when the MAC PDU is transmitted and this PDU includes a Long or Short BSR MAC CE which contains buffer status up to (and including) the last event that triggered a BSR prior to the MAC PDU assembly. Except for SCell beam failure recovery, all pending SR(s) for BSR triggered according to the BSR procedure shall be cancelled and each respective sr-ProhibitTimer shall be stopped when the UL grant(s) can accommodate all pending data available for transmission. All pending SR(s) for Pre-emptive BSR triggered according to the Pre-emptive BSR procedure prior to the MAC PDU assembly shall be cancelled and each respective sr-ProhibitTimer shall be stopped when a MAC PDU containing the relevant Pre-emptive BSR MAC CE is transmitted. Pending SR triggered for beam failure recovery of an SCell shall be cancelled and respective sr-ProhibitTimer shall be stopped when the MAC PDU is transmitted and this PDU includes an BFR MAC CE or Truncated BFR MAC CE which contains beam failure recovery information of that SCell. Pending SR triggered for beam failure recovery of an SCell shall be cancelled upon deactivation of that SCell.

The MAC entity shall for each pending SR triggered by consistent LBT failure for a Serving Cell:
1> if a MAC PDU is transmitted and the MAC PDU includes an LBT failure MAC CE that indicates consistent LBT failure for the Serving Cell that triggered this SR; or
1> if all the triggered consistent LBT failure(s) for that Serving Cell that triggered this SR are cancelled:
2> cancel the pending SR and stop the corresponding sr-ProhibitTimer, if running.

Only PUCCH resources on a BWP which is active at the time of SR transmission occasion are considered valid.

As long as at least one SR is pending, the MAC entity shall for each pending SR:
1> if the MAC entity has no valid PUCCH resource configured for the pending SR:
2> initiate a Random Access procedure on the SpCell and cancel the pending SR.
1> else, for the SR configuration corresponding to the pending SR:
2> when the MAC entity has an SR transmission occasion on the valid PUCCH resource for SR configured; and
2> if sr-ProhibitTimer is not running at the time of the SR transmission occasion; and
2> if the PUCCH resource for the SR transmission occasion does not overlap with a measurement gap:
3> if the PUCCH resource for the SR transmission occasion overlaps with neither a UL-SCH resource nor an SL-SCH resource; or
3> if the MAC entity is able to perform this SR transmission simultaneously with the transmission of the SL-SCH resource; or
3> if the MAC entity is configured with lch-basedPrioritization, and the PUCCH resource for the SR transmission occasion does not overlap with an uplink grant received in a Random Access Response nor with the PUSCH duration of a MSGA payload, and the PUCCH resource for the SR transmission occasion for the pending SR triggered overlaps with any other UL-SCH resource(s), and the physical layer can signal the SR on one valid PUCCH resource for SR, and the priority of the logical channel that triggered SR is higher than the priority of the uplink grant(s) for any UL-SCH resource(s) where the uplink grant was not already de-prioritized, and the priority of the uplink grant is determined; or
3> if both sl-Priorilizationthres and ul-Prioritizationthres are configured and the PUCCH resource for the SR transmission occasion for the pending SR triggered overlaps with any UL-SCH resource(s) carrying a MAC PDU, and the priority of the triggered SR determined is lower than sl-Prioril-izationthres and the value of the highest priority of the logical channel(s) in the MAC PDU is higher than or equal to ul-Prioritizationthres and the MAC PDU is not prioritized by upper layer; or
3> if a SL-SCH resource overlaps with the PUCCH resource for the SR transmission occasion for the pending SR triggered, and the MAC entity is not able to perform this SR transmission simultaneously with the transmission of the SL-SCH resource, and either transmission on the SL-SCH resource is not prioritized or the priority value of the logical channel that triggered SR is lower than ul-Prioritizationthres, if configured; or
3> if a SL-SCH resource overlaps with the PUCCH resource for the SR transmission occasion for the pending SR triggered, and the MAC entity is not able to perform this SR transmission simultaneously with the transmission of the SL-SCH resource, and the priority of the triggered SR determined is higher than the priority of the MAC PDU determined for the SL-SCH resource:
4> consider the SR transmission as a prioritized SR transmission.
4> consider the other overlapping uplink grant(s), if any, as a de-prioritized uplink grant(s);
4> if SR_COUNTER<sr-TransMax:
5> instruct the physical layer to signal the SR on one valid PUCCH resource for SR;
5> if LBT failure indication is not received from lower layers:
6> increment SR_COUNTER by 1;
6> start the sr-ProhibitTimer.
5> else if lbt-FailureRecoveryConfig is not configured:
6> increment SR_COUNTER by 1.
4> else:
5> notify RRC to release PUCCH for all Serving Cells;
5> notify RRC to release SRS for all Serving Cells;
5> clear any configured downlink assignments and uplink grants;

5> clear any PUSCH resources for semi-persistent CSI reporting;
5> initiate a Random Access procedure on the SpCell and cancel all pending SRs.
3> else:
4> consider the SR transmission as a de-prioritized SR transmission.

NOTE 1: Except for SR for SCell beam failure recovery, the selection of which valid PUCCH resource for SR to signal SR on when the MAC entity has more than one overlapping valid PUCCH resource for the SR transmission occasion is left to UE implementation NOTE 2: If more than one individual SR triggers an instruction from the MAC entity to the PHY layer to signal the SR on the same valid PUCCH resource, the SR COUNTER for the relevant SR configuration is incremented only once.

NOTE 3: When the MAC entity has pending SR for SCell beam failure recovery and the MAC entity has one or more PUCCH resources overlapping with PUCCH resource for SCell beam failure recovery for the SR transmission occasion, the MAC entity considers only the PUCCH resource for SCell beam failure recovery as valid.

For a UE operating in a semi-static channel access mode, PUCCH resources overlapping with the idle time of a fixed frame period are not considered valid.

The MAC entity may stop, if any, ongoing Random Access procedure due to a pending SR for BSR and BFR which has no valid PUCCH resources configured, which was initiated by MAC entity prior to the MAC PDU assembly. The ongoing Random Access procedure due to a pending SR for BSR may be stopped when the MAC PDU is transmitted using a UL grant other than a UL grant provided by Random Access Response or a UL grant determined for the transmission of the MSGA payload, and this PDU includes a BSR MAC CE which contains buffer status up to (and including) the last event that triggered a BSR prior to the MAC PDU assembly, or when the UL grant(s) can accommodate all pending data available for transmission. The ongoing Random Access procedure due to a pending SR for BFR of an SCell may be stopped when the MAC PDU is transmitted using a UL grant other than a UL grant provided by Random Access Response or a UL grant determined for the transmission of the MSGA payload and this PDU contains an BFR MAC CE or Truncated BFR MAC CE which includes beam failure recovery information of that SCell. Upon deactivation of SCell configured with beam failure detection the ongoing Random Access procedure due to a pending SR for BFR may be stopped if all triggered BFRs for SCells are cancelled.

The MAC entity may stop, if any, ongoing Random Access procedure due to a pending SR for consistent LBT failure, which has no valid PUCCH resources configured, if: all the SCells that triggered consistent LBT failure are deactivated; or a MAC PDU is transmitted using a UL grant other than a UL grant provided by Random Access Response or a UL grant determined for the transmission of the MSGA payload, and this PDU includes an LBT failure MAC CE that indicates consistent LBT failure for all the SCells that triggered consistent LBT failure.

Buffer Status Reporting (BSR)

The Buffer Status reporting (BSR) procedure is used to provide the serving gNB with information about UL data volume in the MAC entity.

RRC configures the following parameters to control the BSR: periodicBSR-Timer; retxBSR-Timer; logicalChannelSR-DelayTimerApplied; logicalChannelSR-DelayTimer; logicalChannelSR-Mask; logicalChannelGroup.

Each logical channel may be allocated to an LCG using the logicalChannelGroup. The maximum number of LCGs is eight. The MAC entity determines the amount of UL data available for a logical channel according to the data volume calculation procedure.

A BSR shall be triggered if any of the following events occur:

UL data, for a logical channel which belongs to an LCG, becomes available to the MAC entity; and either this UL data belongs to a logical channel with higher priority than the priority of any logical channel containing available UL data which belong to any LCG; or none of the logical channels which belong to an LCG contains any available UL data. In which case the BSR is referred below to as 'Regular BSR'. UL resources are allocated and number of padding bits is equal to or larger than the size of the Buffer Status Report MAC CE plus its subheader, in which case the BSR is referred below to as 'Padding BSR'; retxBSR-Timer expires, and at least one of the logical channels which belong to an LCG contains UL data, in which case the BSR is referred below to as 'Regular BSR'; periodicBSR-Timer expires, in which case the BSR is referred below to as 'Periodic BSR'.

NOTE 1: When Regular BSR triggering events occur for multiple logical channels simultaneously, each logical channel triggers one separate Regular BSR.

For Regular BSR, the MAC entity shall:
1> if the BSR is triggered for a logical channel for which logicalChannelSR-DelayTimerApplied with value true is configured by upper layers:
2> start or restart the logicalChannelSR-DelayTimer.
1> else:
2> if running, stop the logicalChannelSR-DelayTimer.
For Regular and Periodic BSR, the MAC entity shall:
1> if more than one LCG has data available for transmission when the MAC PDU containing the BSR is to be built:
2> report Long BSR for all LCGs which have data available for transmission.
1> else:
2> report Short BSR.
For Padding BSR, the MAC entity shall:
1> if the number of padding bits is equal to or larger than the size of the Short BSR plus its subheader but smaller than the size of the Long BSR plus its subheader:
2> if more than one LCG has data available for transmission when the BSR is to be built:
3> if the number of padding bits is equal to the size of the Short BSR plus its subheader:
4> report Short Truncated BSR of the LCG with the highest priority logical channel with data available for transmission.
3> else:
4> report Long Truncated BSR of the LCG(s) with the logical channels having data available for transmission following a decreasing order of the highest priority logical channel (with or without data available for transmission) in each of these LCG(s), and in case of equal priority, in increasing order of LCGID.
2> else:
3> report Short BSR.
1> else if the number of padding bits is equal to or larger than the size of the Long BSR plus its subheader:

2> report Long BSR for all LCGs which have data available for transmission.

For BSR triggered by retxBSR-Timer expiry, the MAC entity considers that the logical channel that triggered the BSR is the highest priority logical channel that has data available for transmission at the time the BSR is triggered.

The MAC entity shall:
1> if the Buffer Status reporting procedure determines that at least one BSR has been triggered and not cancelled:
2> if UL-SCH resources are available for a new transmission and the UL-SCH resources can accommodate the BSR MAC CE plus its subheader as a result of logical channel prioritization:
3> instruct the Multiplexing and Assembly procedure to generate the BSR MAC CE(s);
3> start or restart periodicBSR-Timer except when all the generated BSRs are long or short Truncated BSRs;
3> start or restart retxBSR-Timer.
2> if a Regular BSR has been triggered and logicalChannelSR-DelayTimer is not running:
3> if there is no UL-SCH resource available for a new transmission; or
3> if the MAC entity is configured with configured uplink grant(s) and the Regular BSR was triggered for a logical channel for which logicalChannelSR-Mask is set to false; or
3> if the UL-SCH resources available for a new transmission do not meet the LCP mapping restrictions configured for the logical channel that triggered the BSR:
4> trigger a Scheduling Request.

NOTE 2: UL-SCH resources are considered available if the MAC entity has an active configuration for either type of configured uplink grants, or if the MAC entity has received a dynamic uplink grant, or if both of these conditions are met. If the MAC entity has determined at a given point in time that UL-SCH resources are available, this need not imply that UL-SCH resources are available for use at that point in time.

A MAC PDU shall contain at most one BSR MAC CE, even when multiple events have triggered a BSR. The Regular BSR and the Periodic BSR shall have precedence over the padding BSR.

The MAC entity shall restart retxBSR-Timer upon reception of a grant for transmission of new data on any UL-SCH.

All triggered BSRs may be cancelled when the UL grant(s) can accommodate all pending data available for transmission but is not sufficient to additionally accommodate the BSR MAC CE plus its subheader. All BSRs triggered prior to MAC PDU assembly shall be cancelled when a MAC PDU is transmitted and this PDU includes a Long or Short BSR MAC CE which contains buffer status up to (and including) the last event that triggered a BSR prior to the MAC PDU assembly.

NOTE 3: MAC PDU assembly can happen at any point in time between uplink grant reception and actual transmission of the corresponding MAC PDU. BSR and SR can be triggered after the assembly of a MAC PDU which contains a BSR MAC CE, but before the transmission of this MAC PDU. In addition, BSR and SR can be triggered during MAC PDU assembly.

NOTE 4: Void

NOTE 5: If a HARQ process is configured with cg-RetransmissionTimer and if the BSR is already included in a MAC PDU for transmission by this HARQ process, but not yet transmitted by lower layers, it is up to UE implementation how to handle the BSR content.

Commercial interests for some embodiments are as follows. 1. Solving issues in the prior art. 2. Providing prioritization involving scheduling request (SR). 3. Providing a good communication performance. 4. Providing a high reliability. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

FIG. 4 is a block diagram of an example system 700 for wireless communication according to an embodiment of the present disclosure. Embodiments described herein may be implemented into the system using any suitably configured hardware and/or software. FIG. 4 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with some embodiments, it is understood that the present disclosure is not limited to the disclosed embodiments but is intended to cover various arrangements made without departing from the scope of the broadest interpretation of the appended claims.

What is claimed is:

1. A method for wireless communication by a user equipment (UE), comprising:
    performing, by the UE, a first operation for a pending scheduling request (SR),
    wherein the first operation comprises if a resource for a SR transmission occasion overlaps with data, the UE performing a first prioritization based on at least one of the followings:
        prioritizing a secondary cell (SCell) beam failure recovery (BFR) SR or the data;

prioritizing the SCell BFR SR having a higher priority than a priority of the data; and prioritizing the SCell BFR SR if no high priority data is multiplexed or can be multiplexed in a grant, wherein the data comprises an uplink shared channel (UL-SCH) resource.

2. The method of claim 1, wherein the first prioritization can be performed in one or more of a medium access control (MAC) layer and a physical (PHY) layer of the UE.

3. The method of claim 1, wherein the first prioritization can be performed in one or more of a medium access control (MAC) layer and a physical (PHY) layer of the UE.

4. A user equipment (UE), comprising:

a memory;

a transceiver; and a processor coupled to the memory and the transceiver, wherein the processor is configured to perform a first operation for a pending scheduling request (SR), wherein the first operation comprises if a resource for a SR transmission occasion overlaps with data, the processor performing a first prioritization based on at least one of the followings:

prioritizing a secondary cell (SCell) beam failure recovery (BFR) SR or the data;

prioritizing the SCell BFR SR having a higher priority than a priority of the data; and prioritizing the SCell BFR SR if no high priority data is multiplexed or can be multiplexed in a grant, wherein the data comprises an uplink shared channel (UL-SCH) resource.

5. The UE of claim 4, wherein the first prioritization can be performed in one or more of a medium access control (MAC) layer and a physical (PHY) layer of the UE.

6. The UE of claim 4, wherein the first prioritization can be performed in one or more of a medium access control (MAC) layer and a physical (PHY) layer of the UE.

7. A base station, comprising:

a memory;

a transceiver; and a processor coupled to the memory and the transceiver, wherein the processor is configured to determine, from a user equipment (UE), a pending scheduling request (SR), wherein the pending SR is associated with a first operation, wherein the first operation comprises if a resource for a SR transmission occasion overlaps with data, a first prioritization performed by the UE being based on at least one of the followings:

prioritizing a secondary cell (SCell) beam failure recovery (BFR) SR or the data;

prioritizing the SCell BFR SR having a higher priority than a priority of the data; and prioritizing the SCell BFR SR if no high priority data is multiplexed or can be multiplexed in a grant, wherein the data comprises an uplink shared channel (UL-SCH) resource.

8. The base station of claim 7, wherein the first prioritization can be performed in one or more of a medium access control (MAC) layer and a physical (PHY) layer of the UE.

9. The base station of claim 7, wherein the first prioritization can be performed in one or more of a medium access control (MAC) layer and a physical (PHY) layer of the UE.

* * * * *